3,158,616
N-SUBSTITUTED 4-ARYL-4-ALKANOYLOXY-
PIPERIDINES
Franz Adickes and Karl Zeile, Ingelheim (Rhine), Germany, assignors, by mesne assignments, to Boehringer Ingelheim G.m.b.H., Ingelheim (Rhine), Germany, a corporation of Germany
No Drawing. Filed Mar. 16, 1962, Ser. No. 180,319
10 Claims. (Cl. 260—293.4)

This invention relates to N-substituted 4-aryl-4-alkanoyloxy-piperidines and their non-toxic, pharmacologically acceptable acid addition salts.

More particularly, the present invention relates to 4-aryl-4-alkanoyloxy-piperidines of the formula

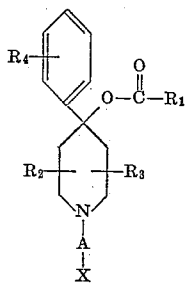
(I)

wherein $R_1$ is lower alkyl,
$R_2$ and $R_3$ are selected from the group consisting of hydrogen and lower alkyl,
$R_4$ is selected from the group consisting of hydrogen, lower alkyl and lower alkoxy,
A is a saturated or unsaturated, straight or branched hydrocarbon chain of 5 to 8 carbon atoms, which may be interrupted by oxygen or sulfur, and
X is selected from the group consisting of halogen, nitro and thiocyano (—SCN), and their non-toxic, pharmacologically acceptable acid addition salts.

Among the broad group of compounds of the Formula I above, however, there is a preferred group wherein $R_1$ is lower alkyl, especially methyl and ethyl,
$R_2$ is hydrogen,
$R_3$ is hydrogen or lower alkyl, especially 3-methyl,
$R_4$ is hydrogen, lower alkyl or lower alkoxy, especially 2-methyl or 3-methoxy,
A is alkylene of 5 to 8 carbon atoms, alkenylene of 5 to 8 carbon atoms, especially pentenylene

or a saturated hydrocarbon chain of 5 to 8 carbon atoms which is interrupted by from 1 to 2 oxygen or sulfur atoms of the formula —$(CH_2)_m$—Y—$(CH_2)_n$— or —$(CH_2)_m$—Y—$(CH_2)_n$—Y—$(CH_2)_o$— where $m$, $n$ and $o$ are integers from 2 to 4 and the sum of $m$, $n$ and $o$ is an integer from 5 to 8, and Y is oxygen or sulfur, especially —$(CH_2)_4$—O—$(CH_2)_4$
—$(CH_2)_2$—O—$(CH_2)_2$—O—$(CH_2)_2$—
(—$(CH_2)_3$—S—$(CH_2)_3$— and

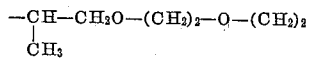

and X is halogen, nitro or thiocyano, and their non-toxic, pharmacologically acceptable acid addition salts.

The compounds of the present invention, that is the N-substituted 4-aryl-4-alkanoyloxy-piperidines embraced by Formula I above and their non-toxic, pharmacological-ly acceptable acid addition salts, may be prepared by a number of different methods which are well known in principle. However, among these the following methods have proved to be especially advantageous:

METHOD A

For compounds wherein A is a bivalent saturated hydrocarbon chain, such as pentylene, hexylene, heptylene or octylene, the following procedure may be used:

Reaction of a 4-aryl-4-hydroxy-piperidine of the formula

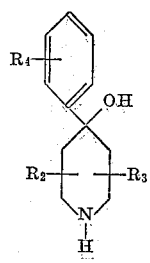
(II)

wherein $R_2$, $R_3$ and $R_4$ have the meanings defined above in connection with Formula I, with a halogen compound of the formula Hal—A—X (III)

wherein X has the meanings defined above in connection with Formula I, A is a bivalent saturated hydrocarbon chain of 5 to 8 carbon atoms and Hal is a halogen, preferably chlorine, bromine or iodine to form a corresponding N-substituted 4-aryl-4-hydroxy-piperidine of the formula

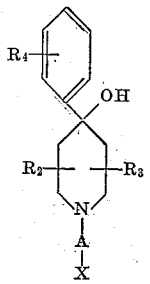
(IV)

wherein $R_2$, $R_3$, $R_4$, A and X have the meanings previously defined.

The reaction of Compound II with Compound III is preferably performed in the presence of an inert organic solvent, such as methanol, ethanol and acetonitrile or mixtures thereof, and at a temperature between 0 and 100° C. The reactants may be supplied in equimolar ratio, but the presence of an excess of Compound III is preferred.

The N-substituted 4-aryl-4-hydroxy-piperidine of the Formula IV which is thus obtained is then subjected to an esterification reaction with a customary esterifying agent, such as an alkanoic acid chloride of the formula

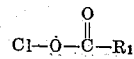
(V)

wherein $R_1$ has the meaning defined above in connection with Formula I, or a corresponding alkanoic acid anhydride or ketene, to convert the 4-hydroxy group into an alkanoyloxy group and thus form the desired N-substituted 4-aryl-4-alkanoyloxy-piperidine of the Formula I. The esterification reaction is preferably carried out in the presence of an inert organic solvent, such as chloroform or benzene; however, a stoichiometric excess of the alkanoylation agent may also be used as the solvent medium.

METHOD B

For the preparation of compounds of the Formula I wherein A is a bivalent unsaturated hydrocarbon chain, such as pentenylene (—$CH_2$—$CH_2$—CH=CH—$CH_2$—) and the like, the following procedure may be used:

Reaction of a 4-aryl-4-alkanoyloxy-piperidine of the formula

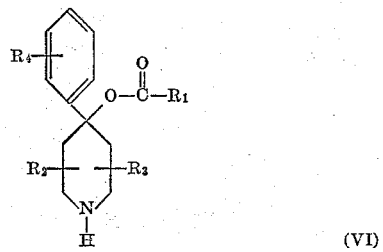

(VI)

wherein $R_1$, $R_2$, $R_3$ and $R_4$ have the meanings previously defined, with a halogen compound of the formula $$Hal—A—A \quad (IIIa)$$

wherein X has the meanings previously defined, A is a bivalent unsaturated hydrocarbon chain of 5 to 8 carbon atoms and Hal is a halogen, under the conditions described in method A. Since the free 4-aryl-4-alkanoyloxy-piperidines VI rapidly rearrange into the corresponding N-alkanoyl-4-aryl-4-hydroxy-piperidines, it is necessary to employ compounds VI in the form of relatively stable salts of a weak acid, preferably in the form of their carbonates.

METHOD C

Reaction of an N-substituted piperidone-(4) compound of the formula

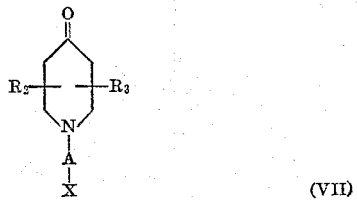

(VII)

wherein $R_2$, $R_3$, A and X have the meanings previously defined in connection with Formula I, with a Grignard compound of the formula

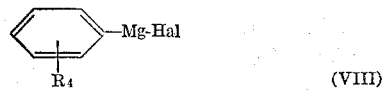

(VIII)

or a corresponding aryl-lithium compound of the formula

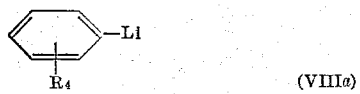

(VIIIa)

wherein $R_4$ has the meanings previously defined and Hal is a halogen, and subsequent hydrolysis of the reaction product to form a compound of the Formula IV, which is then esterified, as described in method A, with a compound of the Formula V or a corresponding alkanoic acid anhydride or ketene to yield the desired N-substituted 4-aryl-4-alkanoyloxy-piperidine I.

The N-substituted piperidone-(4) compounds of the Formula VII, which are used as starting materials in the present method, may themselves be prepared in the following ways:

(a) By addition reaction between 2 mols of an acrylic acid alkyl ester and 1 mol of a haloalkylamine, subsequent internal ester condensation, acid hydrolysis and decarboxylation. Piperidone-(4) compounds VII which are substituted in the piperidine ring may be obtained analogously by using correspondingly substituted acrylic acid alkyl esters.

(b) By condensation of imino-di-($\beta,\beta'$-propionic acid esters) with dihaloalkyl compounds, and subsequent internal ester condensation, acid hydrolysis and decarboxylation.

(c) By a Mannich reaction under customary conditions, starting from nitro- or halo-alkylamines, formaldehyde and diethyl-ketone or $\alpha$-alkyl- or $\alpha,\alpha$-dialkyl-acetonedicarboxylic acid-alkyl esters, and subsequent acid hydrolysis and decarboxylation.

METHOD D

Quarternization of an N-allyl-4-aryl-4-alkanoyloxy-piperidine of the formula

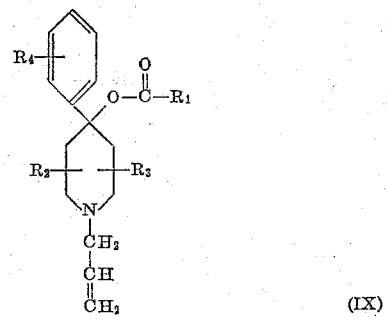

(IX)

wherein $R_1$, $R_2$, $R_3$ and $R_4$ have the meanings previously defined in connection with Formula I, with a halogen compound of the Formula III to form a compound of the formula

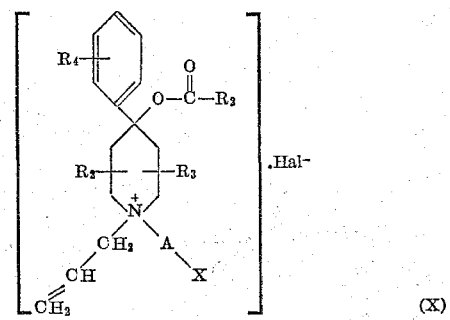

(X)

wherein $R_1$, $R_2$, $R_3$, $R_4$, A and X have the meanings previously defined and Hal is a halogen, and subsequent removal of the allyl substituent by catalytic hydrogenation under customary conditions, such as in the presence of Raney-nickel at about 100 atmospheres, to form the desired N-substituted 4-aryl-4-alkanoyloxy-piperidine of the Formula I.

The quaternization reaction is advantageously performed in the presence of an inert organic solvent, such as acetonitrile, and at temperatures between between 0 and 100° C.

The N-allyl-4-aryl-4-alkanoyloxy-piperidines IX, which are used as starting materials in the present method, may themselves be prepared by well known methods, such as by the method described in German application B 59,352 IVb/12p. Briefly, this method comprises first preparing a 4-phenyl-4-alkanoyl-piperidine compound of the Formula VI or an N-allyl-4-phenyl-4-hydroxy-piperidine compound of the formula

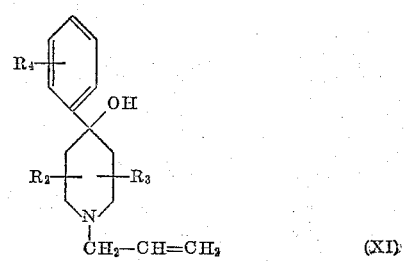

(XI)

wherein $R_2$, $R_3$ and $R_4$ have the meanings previously defined. Thereafter, Compound VI is condensed with an allyl halide or Compound XI is esterified with a customary esterifying agent, such as an alkanoic acid chloride of the Formula V or a corresponding alkanoic acid anhydride or ketene, as described in method A.

METHOD E

Quaternization of an N-allyl-4-aryl-4-hydroxypiperidine of the Formula XI with a halogen compound of the Formula III under the conditions described in method D to form a compound of the formula

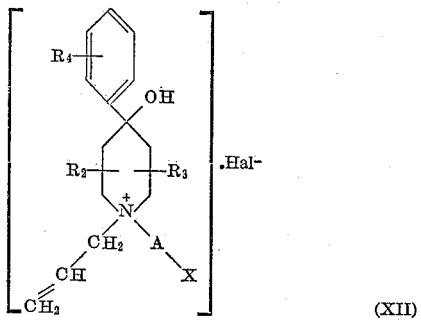

wherein $R_2$, $R_3$, $R_4$, A and X have the meanings previously defined and Hal is a halogen, removal of the allyl substituent by catalytic hydrogenation as described in method D to form a compound of the Formula IV, and esterification of Compound IV as described in method A to form a compound of the Formula I.

METHOD F

Exchange of the bromine atom in a compound of the formula

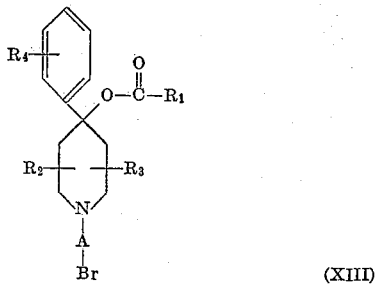

wherein $R_1$, $R_2$, $R_3$ and A have the meanings previously defined, for an iodine atom, a thiocyano group or a nitro group.

The exchange of bromine for iodine is advantageously effected by reacting Compound XIII with potassium iodide in the presence of an inert organic solvent, such as acetone. Similarly, the exchange of bromine for the thiocyano group may be effected by reacting Compound XIII with potassium thiocyanate in an inert organic solvent, and the exchange of bromine for the nitro group may be accomplished by reaction of Compound XIII with silver nitrite in the presence of an inert organic solvent.

The non-toxic acid addition salts of the basic compounds embraced by Formula I above may be obtained by reacting the free bases with an inorganic or organic acid comprising a physiologically compatible anion, for example in ethereal or alcoholic solution, that is, by methods customarily employed for the preparation of acid addition salts of organic compounds comprising a basic nitrogen atom. Typical examples of such acids are hydrochloric acid, hydrobromic acid, sulfuric acid, nitric acid, methane sulfonic acid, tartaric acid, succinic acid, salicylic acid and the like.

The following examples shall further illustrate our invention and enable others skilled in the art to understand the invention more completely. It should be understood, however, that our invention is not limited to these particular examples.

Example 1

PREPARATION OF N-(6'-NITRO-n-HEXYL-1')-4-PHENYL-4-ACETOXY-PIPERIDINE HYDROCHLORIDE BY METHOD A 8.8 gm. (0.05 mol) of 4-phenyl-4-hydroxy-piperidine were dissolved in 50 cc. of ethanol. The resulting solution was admixed with 13 gm. (0.06 mol) of 6-nitro-n-hexyl-bromide-1, and the mixture was allowed to stand for twenty-four hours at 20° C. Thereafter, the reaction mixture was concentrated by evaporation in vacuo, and the residue was taken up in dilute hydrochloric acid. The acid solution was then extracted with ether. The aqueous phase was made alkaline with 2 N NH$_3$ and was again extracted with ether. After separating the ether phase from the aqueous phase, the ether phase was dried over sodium sulfate and the ether was evaporated. 14.8 gm. (97% of theory) of N-(6'-nitro-n-hexyl-1')-4-phenyl-4-hydroxy-piperidine were obtained. This free base was dissolved in 70 cc. of benzene, the resulting solution was admixed with 15 cc. of acetyl chloride and the mixture was refluxed for one hour. Thereafter, the reaction mixture was evaporated to dryness in vacuo, and the residue was recrystallized from acetone. 8.2 gm. (43% of theory) of N-(6'-nitro-n-hexyl-1')-4-phenyl-4-acetoxy-piperidine hydrochloride of the formula

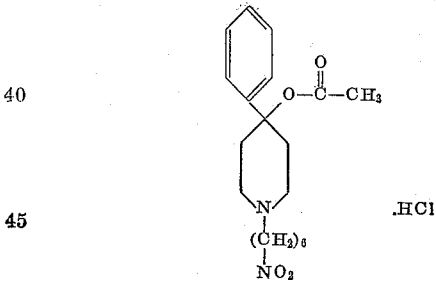

were obtained. The product had a melting point of 164–166° C.

When dry gaseous hydrogen chloride was passed through the dried ethereal solution obtained from the last ether extraction step in the above procedure, N-(6'-n-hexyl-1')-4-phenyl-4-hydroxy-piperidine hydrochloride was obtained, which had a melting point of 151–153° C. after recrystallization from acetone.

The N-(6'-nitro-n-hexyl-1)-4-phenyl-4-acetoxy-piperidine hydrochloride was converted by conventional methods into the following acid addition salts:

Hydrobromide—M.P. 158–161° C. (recrystallized from ethanol)

Nitrate—M.P. 145° C. (recrystallized from ethanol)

Methane sulfonate—M.P. 112–114° C. (recrystallized from ethyl acetate)

Bisulfate—M.P. 128–130° C. (recrystallized from isopropanol)

Bi-(d)-tartrate—M.P. 65–69° C.

Using a procedure analogous to that described above, the following additional N-(ω'-nitro-alkyl-1')-4-phenyl-4-acetoxy-piperidine hydrochlorides were prepared:

(a) N-(7'-nitro-n-heptyl-1')-4-phenyl-4-acetoxy-piperidine hydrochloride, M.P. 169–171° C. after recrystallization from a mixture of butanone and isopropanol, of the formula

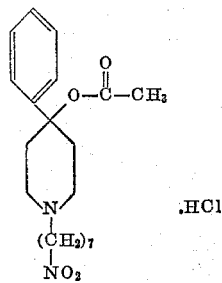

starting from 4-phenyl-4-hydroxy-piperidine and 7-nitro-n-heptyl-bromide-1. Yield: 94.5% of theory.

(b) N - (8'-nitro-n-octyl-1')-4-phenyl-4-acetoxy-piperidine hydrochloride, M.P. 179–180° C. after recrystallization from butanone, of the formula

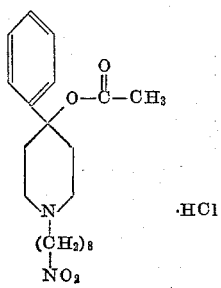

starting from 8-nitro-n-octyl-bromide-1 and 4-phenyl-4-hydroxy-piperidine. Yield: 71% of theory.

(c) N - (6' - nitro-n-hexyl-1')-3-methyl-4-phenyl-4-acetoxy-piperidine hydrochloride, M.P. 157–163° C. after recrystallization from ethyl acetate, of the formula

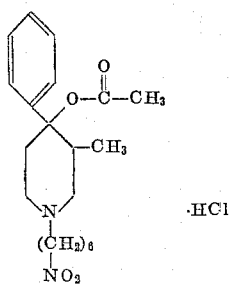

starting from 6-nitro-n-hexyl-bromide-1 and 3-methyl-4-phenyl-4-hydroxy-piperidine. Yield: 44% of theory.

(d) N - (7'-nitro-n-heptyl-1')-3-methyl-4-phenyl-4-acetoxy-piperidine hydrochloride, M.P. 146–147° C. after recrystallization from butanone, of the formula

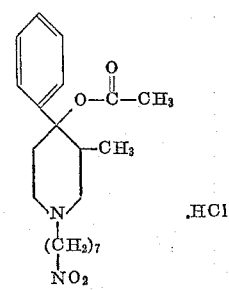

starting from 7nitro-n-heptyl-bromide-1 and 3-methyl-4-phenyl-4-hydroxy-piperidine. Yield: 76.5% of theory.

(e) N-(7'-nitro-n-heptyl-1')-4-(3''-methoxy-phenyl)-4-acetoxy-piperidine hydrochloride, M.P. 110–116° C. after recrystallization from ethyl acetate, of the formula

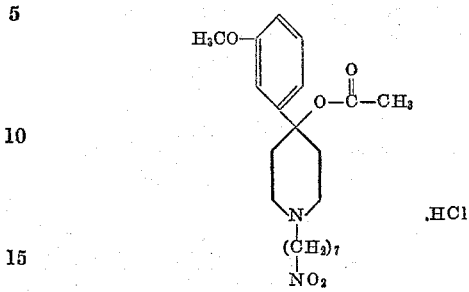

starting from 7-nitro-n-heptyl-bromide-1 and 4-(3'-methoxy - phenyl) - 4 - hydroxy-piperidine. Yield: 72% of theory.

(f) N - (7'-nitro-n-heptyl-1')-3-methyl-4-(3''-methoxyphenyl)-4-acetoxy-piperidine hydrochloride, M.P. 124–128° C. after recrystallization from a mixture of acetone and ethyl acetate, of the formula

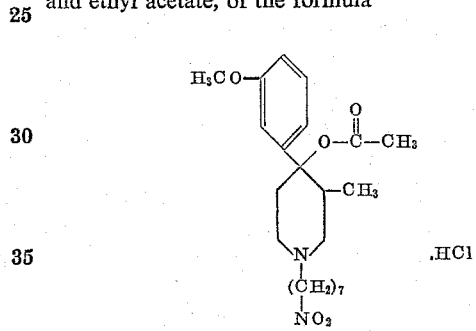

starting from 7-nitro-n-heptyl-bromide-1 and 3-methyl-4-(3'-methoxy-phenyl)-4-hydroxy-piperidine. Yield: 17.7% of theory.

*Example II*

PREPARATION OF N-(6'-FLUORO-N-HEXYL-1')-4-PHENYL-4-PROPIONYLOXY-PIPERIDINE HYDROCHLORIDE BY METHOD A 10 gm. (0.0565 mol) of 4-phenyl-4-hydroxy-piperidine were dissolved in a solvent mixture consisting of 100 cc. of acetonitrile and 25 cc. of methanol. 18 gm. (0.1 mol) of 6-fluoro-n-hexyl-bromide-1 were added to the resulting solution, and the mixture was heated at 60° C. for thirty-six hours. Thereafter, the solvent mixture was distilled off, the residue was taken up in dilute hydrochloric acid and the aqueous acid solution was extracted three times with ether. The aqueous phase was then made alkaline with 2 N NH₃ and was again extracted three times with ether. The ether extract solutions were combined and dried over sodium sulfate. Thereafter, dry gaseous hydrogen chloride was passed through the dry ether extract solution until precipitation was complete. The precipitate was separated by vacuum filtration and recrystallized from acetone. 15.85 gm. (89% of theory) of N-(6'-fluoro-n-hexyl - 1')-4-phenyl-4-hydroxy-piperidine hydrochloride, M.P. 163–165° C., were obtained.

The hydrochloride intermediate thus obtained was converted into the free base by distribution between dilute ammonia and ether. 4 gm. (0.0143 mol) of the free base were dissolved in 50 cc. of benzene. 5.5 gm. (0.06 mol) of propionyl chloride were added to the solution, and the resulting mixture was refluxed for one hour. Thereafter, the benzene and the excess propionyl chloride were distilled off, and the residue was recrystallized from butanone. 4.1 gm. (77% of theory) of N-(6'-fluoro-n- hexyl-1')-4-phenyl-4-propionyloxy-piperidine of the formula

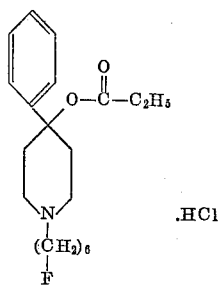

were obtained. It had a melting point of 160–163° C.

Using a procedure analogous to that prescribed above, the following additional N-(ω'-fluoro-alkyl-1')-4-phenyl-4-alkanoyloxy-piperidine hydrochlorides were prepared:

(a) N-(6'-fluoro-n-hexyl-1')-4-phenyl-4-acetoxy-piperidine hydrochloride, M.P. 182–183° C. after recrystallization from butanone, of the formula

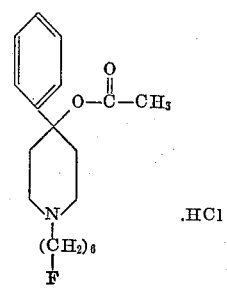

starting from 6-fluoro-n-hexyl-bromide-1 and 4-phenyl-4-hydroxy-piperidine, and esterifying the intermediate N-(6'-fluoro-n-hexyl-1')-4-phenyl-4-hydroxy-piperidine with acetyl chloride in benzene. Yield: 97.6% of theory.

(b) N-(5'-fluoro-n-pentyl-1')-4-phenyl-4-acetoxy-piperidine hydrochloride, M.P. 173–175° C. after recrystallization from butanone, of the formula

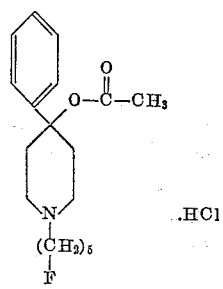

starting from 5'-fluoro-n-pentyl-bromide-1 and 4-phenyl-4-hydroxy-piperidine, and esterifying the intermediate N-(5' - fluoro-n-pentyl-1')-4-phenyl-4-acetoxy - piperidine with acetyl chloride in benzene. Yield: 73% of theory.

(c) N-(7'-fluoro-n-heptyl-1')-4-phenyl-4-acetoxy-piperidine hydrochloride, M.P. 191–192° C. after recrystallization from butanone, of the formula

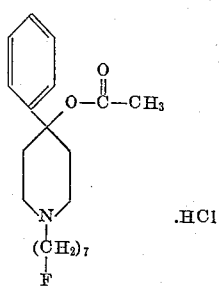

starting from 7-fluoro-n-heptyl-bromide-1 and 4-phenyl-4-hydroxy-piperidine, and esterifying the intermediate N-(7'-fluoro-n-heptyl-1')-4-phenyl-4-hydroxy-piperidine with acetyl chloride in benzene. Yield: 55% of theory.

(d) N-(7'-fluoro-n-heptyl-1')-4-phenyl-4-propionyloxy-piperidine hydrochloride, M.P. 154–155° C. after recrystallization from butanone, of the formula

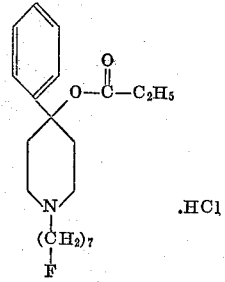

starting from 7-fluoro-n-heptyl-bromide-1 and 4-phenyl-4-hydroxy-piperidine. Yield: 67% of theory.

(e) N-(8'-fluoro-n-octyl-1')-4-phenyl-4-acetoxy-piperidine hydrochloride, M.P. 190–191° C. after recrystallization from butanone, of the formula

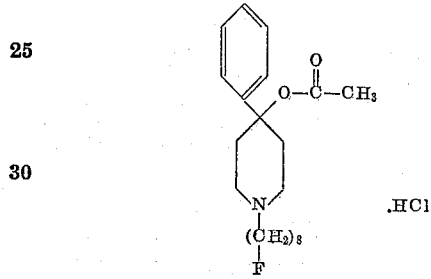

starting from 8-fluoro-n-octyl-bromide-1 and 4-phenyl-4-hydroxy-piperidine, and esterifying the intermediate N-(8'-fluoro-n-octyl-1')-4-phenyl-4-hydroxy-piperidine with acetyl chloride in benzene. Yield: 72% of theory.

(f) N - (6' - fluoro - n - hexyl - 1') - 3 - methyl - 4 - phenyl-4-acetoxy-piperidine hydrochloride, M.P. 180–183° C. after recrystallization from butanone, of the formula

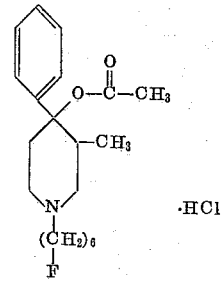

starting from 6-fluoro-n-hexyl-bromide-1 and 3-methyl-4-phenyl-4-hydroxy-piperidine, and esterifying the intermediate N - (6' - fluoro - n - hexyl - 1') - 3 - methyl - 4 - phenyl-4-hydroxy-piperidine with acetyl chloride in benzene. Yield: 32% of theory.

(g) N - (7' - fluoro - n - heptyl - 1') - 3 - methyl - 4 - phenyl-4-acetoxy-piperidine hydrochloride, M.P. 158–160° C. after recrystallization from ethyl acetate, of the formula

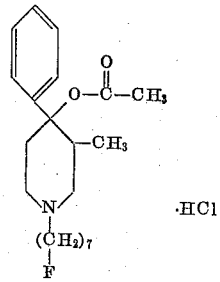

starting from 7-fluoro-n-heptyl-bromide-1 and 3-methyl-4-phenyl-4-hydroxy-piperidine, and esterifying the intermediate N - (7' - fluoro - n - heptyl - 1') - 3 - methyl - 4-phenyl-4-hydroxy-piperidine with acetyl chloride. Yield: 62.8% of theory.

(h) N - (7' - fluoro - n - heptyl - 1') - 3 - methyl - 4-phenyl - 4 - propionyloxy - piperidine hydrochloride, M.P. 141–145° C. after recrystallization from ethyl acetate, of the formula

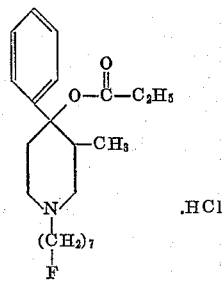

starting from 7-fluoro-n-heptyl-bromide-1 and 3-methyl-4-phenyl-4-hydroxy-piperidine, and esterifying the intermediate N - (7' - fluoro - n - heptyl - 1') - 3 - methyl - 4-phenyl-4-hydroxy-piperidine with propionic acid anhydride in the presence of pyridine. Yield: 54% of theory.

*Example III*

PREPARATION OF N-(6'-CHLORO-n-HEXYL-1')-3-METH-YL-4-PHENYL-4 - ACETOXY - PIPERIDINE HYDROCHLORIDE BY METHOD A 15 gm. (0.0785 mol) of 3-methyl-4-phenyl-4-hydroxy-piperidine were dissolved in 140 cc. of ethanol. 65 gm. (0.42 mol) of hexamethylene-1,6-dichloride were added to the solution, and the resulting mixture was heated at 60° C. for twenty-four hours. Thereafter, the ethanol and the excess hexamethylene-1,6-dichloride were distilled off, and the residue was taken up in dilute hydrochloric acid. The acid solution was extracted with ether. The acid aqueous phase was made alkaline with 2 N NH₃ and was again extracted with ether. After separation from the aqueous phase, the ether phase was dried over sodium sulfate and the ether was distilled off. 21.1 gm. (86% of theory) of N-(6'-chloro-n-hexyl-1')-3-methyl-4-phenyl-4-hydroxy-piperidine were obtained.

3.1 gm. (0.001 mol) of this raw free base were refluxed for one hour with 6 cc. of acetyl chloride. Thereafter, the excess acetyl chloride was removed by evaporation in vacuo. The residue was recrystallized twice from ethyl acetate, yielding 1.85 gm. (48% of theory) of N - (6' - chloro - n - hexyl - 1') - 3 - methyl - 4 - phenyl-4-acetoxy-piperidine hydrochloride of the formula

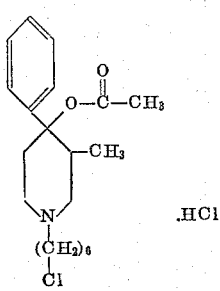

were obtained. It had a melting point of 140–147° C.

Using a procedure analogous to that described above, the following additional N-substituted 4 - phenyl - 4 - alkanoyloxy-piperidine hydrochlorides were prepared:

(a) N-(6'-chloro-n-hexyl-1') - 3 - methyl - 4 - phenyl-4-propionyloxy-piperidine hydrochloride, M.P. 170–171° C. after recrystallization from acetone, of the formula

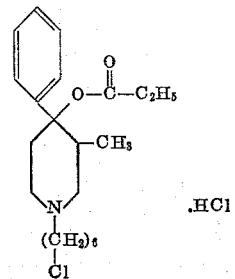

starting from hexamethylene-1,6-dichloride and 3-methyl-4-phenyl-4-hydroxy-piperidine, and esterifying the intermediate N - (6'-chloro-n-hexyl-1')-3-methyl-4-phenyl-4-hydroxy-piperidine with propionyl chloride. Yield: 23% of theory.

(b) N-(6'-chloro-n-hexyl-1')-4-phenyl - 4 - acetoxy-piperidine hydrohloride, M.P. 180–181° C. after recrystallization from acetone, of the formula

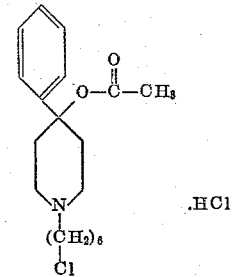

starting from hexamethylene-1,6-dichloride and 4-phenyl-4-hydroxy-piperidine. Yield: 43.5% of theory.

(c) N-(6'-chloro-n-hexyl-1')-4-phenyl - 4 - propionyloxy-piperidine hydrochloride, M.P. 137–140° C. after recrystallization from ethyl acetate, of the formula

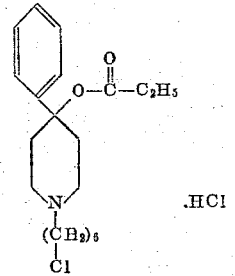

starting from hexamethylene-1,6-dichloride and 4-phenyl-4-hydroxy-piperidine, and esterifying the intermediate N-(6'-chloro-n-hexyl-1')-4-phenyl - 4 - hydroxy-piperidine with propionyl chloride. Yield: 33% of theory.

(d) N-(7'-chloro-n-heptyl-1') - 4 - phenyl - 4 - acetoxy-piperidine hydrochloride, M.P. 149–151° C. after recrystallization from butanone, of the formula

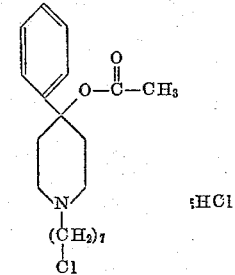

starting from heptamethylene-1,7-dichloride and 4-phenyl-4-hydroxy-piperidine. Yield: 48% of theory.

The hydrochloride was converted into the free base, which was then treated with acetic acid, yielding the acetate. It had a melting point of 186–188° C. after recrystallization from ethyl acetate.

(e) N-(7'-chloro-n-heptyl-1')-4-phenyl - 4 - propionyloxy-piperidine hydrochloride, M.P. 148–150° C. after recrystallization from ethyl acetate, of the formula

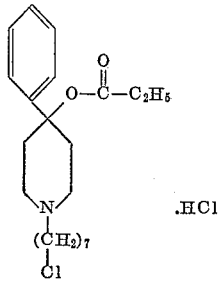

starting from heptamethylene-1,7-dichloride and 4-phenyl-4-hydroxy-piperidine, and esterifying the intermediate N-(7'-chloro-n-heptyl-1')-4-phenyl - 4 - hydroxy-piperidine with propionic acid anhydride in the presence of pyridine. Yield: 31% of theory.

(f) N-(8'-chloro-n-octyl-1')-4-phenyl - 4 - acetoxy-piperidine hydrochloride, M.P. 129–132° C. after recrystallization from acetone, of the formula

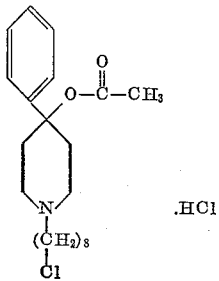

starting from octamethylene-1,8-dichloride and 4-phenyl-4-hydroxy-piperidine. Yield: 56% of theory.

(g) N - (7' - chloro-n-heptyl - 1')-3-methyl-4-phenyl-4-acetoxy-piperidine hydrochloride, M.P. 139–140° C. after recrystallization from butanone, of the formula

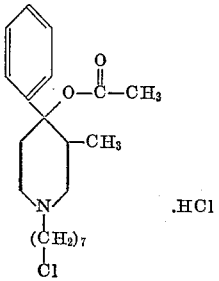

starting from heptamethylene - 1,7 - dichloride and 3-methyl-4-phenyl-4-hydroxy-piperidine. Yield: 72.6% of theory.

(h) N-(7'-chloro-n-heptyl-1')-3-methyl - 4 - phenyl-4-propionyloxy-piperidine hydrochloride, M.P. 140–142° C. after recrystallization from ethyl acetate, of the formula

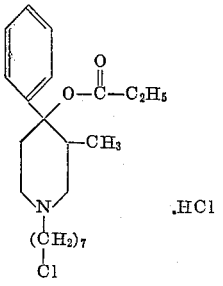

starting from heptamethylene-1,7-dichloride and 3-methyl-4-phenyl-4-hydroxy-piperidine, and esterifying the intermediate N - (7'-chloro-n-heptyl-1')-3-methyl-4-phenyl-4-hydroxy-piperidine with propionic acid anhydride in stoichiometric excess. Yield: 80.2% of theory.

(i) N-(6' - chloro-n-hexyl-1')-4-(3''-methoxy-phenyl)-4-acetoxy-piperidine hydrochloride, M.P. 167–168° C. after recrystallization from acetone, of the formula

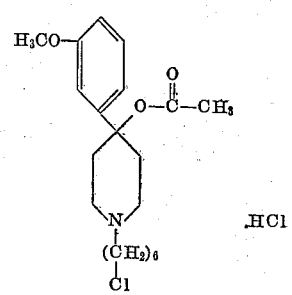

starting from hexamethylene-1,6-dichloride and 4-(3'-methoxy-phenyl)-4-hydroxy-piperidine. Yield: 31% of theory.

(j) N-(6' - chloro-n-hexyl-1')-3-methyl-4-(2''-methylphenyl)-4-acetoxy-piperidine hydrochloride, M.P. 173–175° C. after recrystallization from ethyl acetate, of the formula

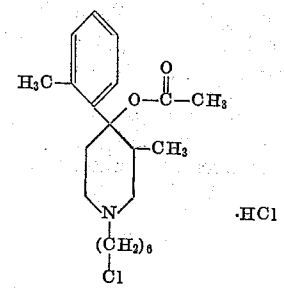

starting from hexamethylene 1,6-dichloride and 3-methyl-4-(2'-methyl-phenyl)-4-hydroxy-piperidine, and esterifying the intermediate N - (6' - chloro-n-hexyl-1')-4-(2''-methyl-phenyl)-4-hydroxy-piperidine with acetic acid anhydride. Yield: 29% of theory.

(k) N-(6'-chloro-n-hexyl-1')-3-methyl-4-(3''-methoxyphenyl)-4-acetoxy-piperidine hydrochloride, M.P. 167–168° C. after recrystallization from ethyl acetate, of the formula

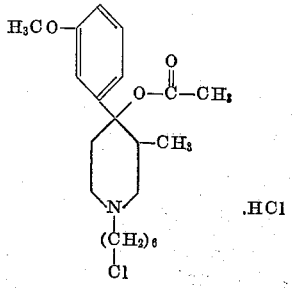

starting from hexamethylene-1,6-dichloride and 3-methyl-4-(3'-methoxy-phenyl)-4-hydroxy-piperidine, and esterifying the intermediate N - (6' - chloro-n-hexyl -1')-3-methyl-4-(3''-methoxy-phenyl) - 4 - hydroxy - piperidine with acetic acid anhydride. Yield: 14% of theory.

(*l*) N - [4' - (4" - chloro-butoxy)-butyl-1']-4-phenyl-4-acetoxy-piperidine hydrochloride, M.P. 166–167° C. after recrystallization from butanone, of the formula

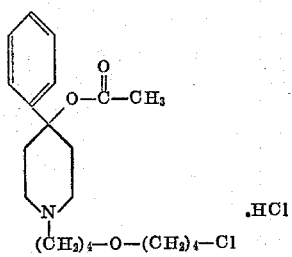

starting from 4-(4'-chloro-butoxy)-butyl-chloride-1 and 4-phenyl-4-hydroxy-piperidine. Yield: 77.3% of theory.

(*m*) N-β-[2' - (2" - chloroethoxy) - ethoxy] - ethyl-4-phenyl - 4 - acetoxy-piperidine hydrochloride, M.P. 119–121° C. after recrystallization from ethyl acetate, of the formula

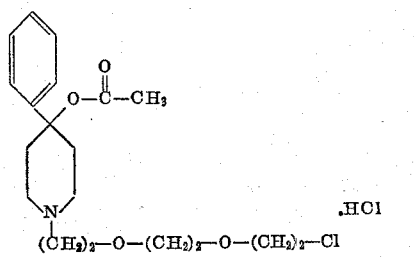

starting from β-[2'-(2"-chloroethoxy) - ethoxy] - ethyl-chloride and 4-phenyl-4-hydroxy-piperidine, and esterifying the intermediate N-β-[2'(2"-chloroethoxy)-ethoxy]-ethyl-4-phenyl-4-hydroxy-piperidine with acetic acid anhydride. Yield: 36% of theory.

(*n*) N - [3'-(3"-chloropropyl-mercaptyl-1")-n-propyl-1']-4-phenyl - 4 - acetoxy-piperidine hydrochloride, M.P. 179–180° C. after recrystallization from acetone, of the formula

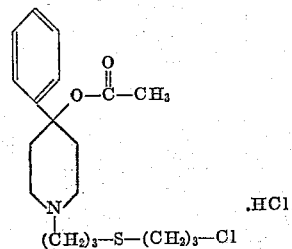

starting from 4-phenyl-4-hydroxy-piperidine and 3-(3'-chloropropyl-mercaptyl - 1')-n-propyl-bromide-1. Yield: 80.7% of theory.

*Example IV*

PREPARATION OF N-(7'-BROMO-n-HEPTYL-1')-4-PHENYL-4-ACETOXY-PIPERIDINE HYDROCHLORIDE BY METHOD A 5 gm. (0.0282 mol) of 4-phenyl-4-hydroxy-piperidine were added within a period of five hours to a solution of 40 gm. (0.155 mol) of heptamethylene-1,7-dibromide in 100 cc. of benzene on a boiling water bath. After all of the piperidine compound had been added, the mixture was heated on the boiling water bath for an additional half hour. Thereafter, the reaction mixture was worked up as described in Example I, yielding 5.9 gm. (59% of theory) of N-(7'-bromo-n-heptyl-1')-4-phenyl-4-hydroxy-piperidine.

0.6 gm. of this free base was treated with ethereal hydrochloric acid, yielding the hydrochloride addition salt which, after recrystallization from acetonitrile, had a melting point of 126–127° C.

The remaining 5.3 gm. (0.0172 mol) of the free base were dissolved in 30 cc. of benzene. 10 cc. of acetyl chloride were added to the solution, and the resulting mixture was heated for one hour on a boiling water bath. Thereafter, the reaction mixture was worked up as described in the corresponding part of Example I, yielding 1.8 gm. (28% of theory) of N-(7'-bromo-n-heptyl-1')-4-phenyl-4-acetoxy-piperidine hydrochloride of the formula

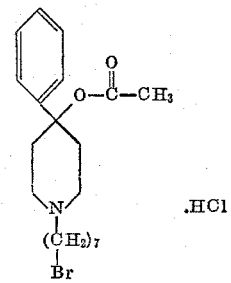

After recrystallization from butanone, the product had a melting point of 186–188° C.

Using a procedure analogous to that described above, the following additional N-substituted 4-phenyl-4-alkanoyloxy-piperidine hydrochlorides were prepared:

(*a*) N-(6'-bromo-n-hexyl-1')-4-phenyl-4-acetoxy-piperidine hydrochloride, M.P. 188–189° C. after recrystallization from acetone, of the formula

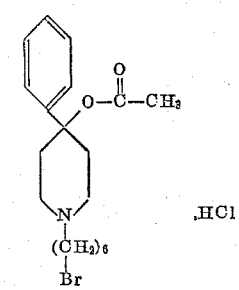

starting from hexamethylene-1,6-dibromide and 4-phenyl-4-hydroxy-piperidine. Yield: 25.8% of theory.

(*b*) N-(6'-bromo-n-hexyl-1')-3-methyl-4 - phenyl - 4-acetoxy-piperidine hydrochloride, M.P. 180 – 181° C. after recrystallization from a mixture of acetone and ethyl acetate of the formula

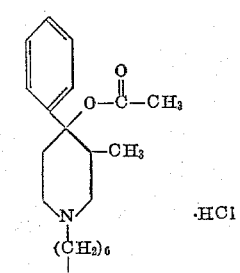

starting from hexamethylene-1,6-dibromide and 3-methyl-4-phenyl-4-hydroxy-piperidine. Yield: 23.4% of theory.

(*c*) N-[2'-(2"-bromoisopropoxy-ethoxy)-ethyl-1'] - 4-phenyl-4-acetoxy-piperidine hydrochloride, M.P. 110–113° C. after recrystallization from ethyl acetate, of the formula

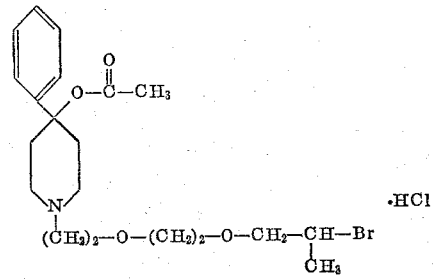

starting from 2-(2'-bromoisopropoxy-ethoxy)-ethyl-bromide-1 and 4-phenyl-4-hydroxy-piperidine. Yield: 65.7% of theory.

Example V

PREPARATION OF N-(6'-FLUORO-n-HEXYL-1')-4-PHENYL-4-ACETOXY-PIPERIDINE HYDROCHLORIDE BY METHOD D 6 gm. (0.027 mol) of N-allyl-4-phenyl-4-hydroxy-piperidine were dissolved in 50 cc. of acetonitrile. The resulting solution was admixed with 10 gm. (0.054 mol) of 1-bromo-6-fluoro-hexamethylene, and the mixture was heated at 60° C. for thirty-six hours. Thereafter, the acetonitrile was distilled off, and the residue was recrystallized from butanone. 8.4 gm. (75.6% of theory) of N-allyl-N-(6'-fluoro-n-hexyl-1')-4-phenyl-4-hydroxy-piperidinium bromide, M.P. 114–115° C., were obtained.

8 gm. of the piperidinium compound thus obtained were subjected to catalytic hydrogenation in methanol at 100 atmospheres pressure in the presence of Raney nickel as the hydrogenation catalyst. Thereafter, the catalyst was removed by filtration, and the methanol was distilled out of the filtrate. The residue was distributed in a mixture of dilute aqueous ammonia and ether, and after the phases had separated the ether phase was isolated and dry gaseous hydrogen chloride was passed therethrough until precipitation was complete. 5 gm. (89.6% of theory) of N-(6'-fluoro-n-hexyl-1')-4-phenyl-4-hydroxy-piperidine hydrochloride, M.P. 163–164° C., were obtained. This product was then esterified with acetyl chloride, as described in Example II, yielding the desired N-(6'-fluoro-n-hexyl-1') - 4-phenyl-4-acetoxy-piperidine hydrochloride of the formula

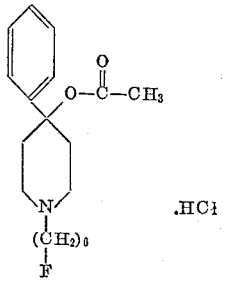

It had a melting point of 183–184° C.

Example VI

PREPARATION OF N-(6'-IODO-n-HEXYL-1')-4-PHENYL-4 - ACETOXY - PIPERIDINE HYDROCHLORIDE BY METHOD F 2.08 gm. (0.005 mol) of N-(6'-bromo-n-hexyl-1')-4-phenyl-4-acetoxy-piperidine hydrochloride (the product of Example IVa) were refluxed for six hours with 4.15 gm. (0.025 mol) of potassium iodide in acetone. Thereafter, the reaction mixture was filtered to remove undissolved inorganic salts, and then the acetone was distilled out of the filtrate. The residue was distributed in a mixture of dilute aqueous ammonia and ether, and after the phases had separated the ether phase was isolated and dry hydrogen chloride gas was passed therethrough until precipitation was complete. 1.2 gm. (51.7% of theory) of N - (6'-iodo-n-hexyl-1')-4-phenyl-4-acetoxy-piperidine hydrochloride of the formula

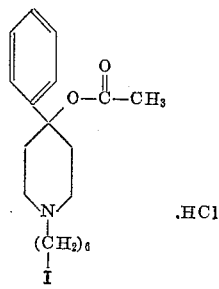

were obtained. It had a melting point of 112–114° C. after recrystallization from a mixture of ethyl acetate and ether.

Example VII

PREPARATION OF N-(6'-NITRO-n-HEXYL-1')-4-PHENYL-4-ACETOXY-PIPERIDINE HYDROCHLORIDE BY A COMBINATION OF METHODS F AND A 3.4 gm. (0.01 mol) of N-(6'-bromo-n-hexyl-1')-4-phenyl-4-hydroxy-piperidine were dissolved in 40 cc. of ethanol. 2 gm. of silver nitrite were added to the solution, and the resulting mixture was shaken for six hours at 20° C. Thereafter, the reaction mixture was filtered to remove undissolved inorganic salts, and then the ethanol was distilled out of the filtrate. The residue was taken up in ether, and dry gaseous hydogen chloride was passed through the ether solution until precipitation was complete, yielding N-(6'-nitro-n-hexy-1')-4-phenyl-4-hydroxy-piperidine hydrochloride. This intermediate acid addition salt was converted into the free base, which was then esterified with acetyl chloride, as described in Example I, to yield N-(6'-nitro-n-hexyl-1')-4-phenyl-4-acetoxy-piperidine hydrochloride of the formula

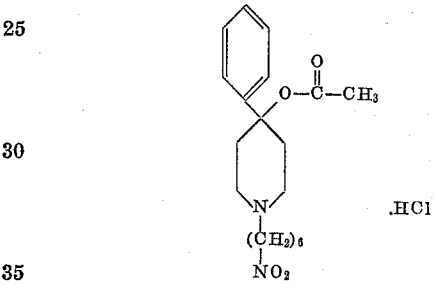

Example VIII

PREPARATION OF N-(6'-THIOCYANO-n-HEXYL-1')-4-PHENYL-4-ACETOXY-PIPERIDINE HYDROCHLORIDE BY METHOD F 12 gm. of N-(6'-bromo-n-hexyl-1')-4-phenyl-4-acetoxy-piperidine hydrochloride (the product of Example IVa) were refluxed for six hours with 24 gm. of potassium thiocyanate in acetone. Thereafter, the reaction mixture was filtered to remove undissolved inorganic salts, and the filtrate was evaporated to dryness. The residue was distributed in a mixture of 2 N NaOH and ether, and the phases were allowed to separate. The ether phase was isolated and was dried over sodium sulfate. Thereafter, dry gaseous hydrogen chloride was passed through the dry ether phase until precipitation was complete. The precipitate was N-(6'-thiocyano-n-hexyl-1')-4-phenyl-4-acetoxy-piperidine hydrochloride of the formula

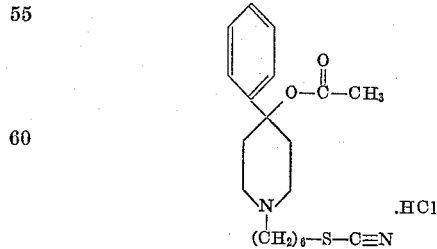

It had a melting point of 156–158° C. after recrystallization from a mixture of acetone and ether. Yield: 27.3% of theory.

Example IX

PREPARATION OF N-[5'-BROMO-PENTEN-(2')-YL-1'-]-4-PHENYL-4-ACETOXY - PIPERIDINE HYDROCHLORIDE BY METHOD B 4-phenyl-4-acetoxy-piperidine hydrochloride was dissolved in a small amount of water. Then, while working in rapid succession, the solution was neutralized at 0° C.

with dilute aqueous sodium hydroxide and carbon dioxide was introduced into the neutral solution. The precipitate formed thereby was filtered off and the filter cake was washed with a small amount of ice cold ethanol and ether. 5 gm. of the filter cake were dissolved in 50 cc. of ethanol, the resulting solution was admixed with 10 gm. of 1-bromo-5-bromo-pentene-2, and the mixture was allowed to stand at 20° C. for twenty-four hours. Thereafter, the ethanol was evaporated in vacuo, and the residue was distributed in a mixture of 2 N hydrochloric acid and ether. The acid aqueous phase was neutralized and was again extracted with ether. After complete separation of the phases the ether phase was isolated and dried over sodium sulfate. Thereafter, dry gaseous hydrogen chloride was passed through the dry ether extract solution until precipitation was complete 2,3 gm. (48.4% of theory) of N-[5'-bromo - penten-(2')-yl-1']-4-phenyl-4-acetoxy-piperidine hydrochloride of the formula

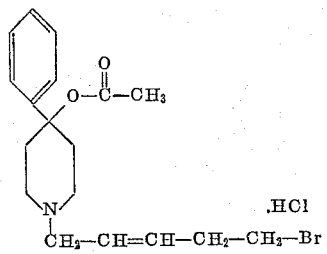

were obtained. It had a melting point of 176–177° C. after recrystallization from acetonitrile.

The compounds of the present invention, that is, the N-substituted 4-aryl-4-alkanoyloxy-piperidines embraced by Formula I and their non-toxic, pharmacologically acceptable acid addition salts, have useful pharmacodynamic properties. More particularly, they exhibit strong central analgesic activities which considerably exceed the analgesic activity of morphine and its acid addition salts. The presence of such pronounced central analgesic activities in the compounds of the present invention is particularly surprising in view of the fact that prior to the advent of our invention it was generally believed by those eminently skilled in the art that the introduction of a long carbon chain into the molecule at the nitrogen of 4-hydroxy-sustituted piperidines would cause any analgesic activity to disappear [see O. J. Braenden, N. B. Eddy and Halbach, Bulletin of the World Health Organization, vol. 13, pages 956–957 (1955)].

The central analgesic activity of the compounds according to the present application was tested and demonstrated on adult white mice, that is, standard experimental animals, by the standard pharmacological test method of F. Haffner, Deutsche Medizinische Wochenschrift, vol. 54, pages 731–733 (1929). Briefly stated, varying doses of nine representative compounds of the group embraced by Formula I above were administered by subcutaneous injection to nine different groups of a statistically significant number of adult white mice. The percentage of mice in each group which showed detectable analgesia was determined for each dosage of each compound, and from these values the $ED_{50}$ of each compound was determined graphically. By "$ED_{50}$" we mean the dose which produces detectable central analgesia in 50% of the animals. The results of these tests are shown in the following table. In addition to the $ED_{50}$, the table also shows the relative central analgesic activity of each compound in comparison to the $ED_{50}$ values of morphine and meperidine (1-methyl-4-phenyl-piperidine - 4 - carboxylic acid ethyl ester), respectively, which are known from the literature. For convenience of comparison, the $ED_{50}$ of morphine (16 mgm./kg.) was assigned an arbitrary value of 1, and the relative analgesic activities of the other compounds in the table have been expressed on this basis.

TABLE

| COMPOUND | $ED_{50}$ Subcutaneous, m.g.m./kg. | Relative Central Analgesic Activity |
|---|---|---|
| Morphine | 16.0 | 1 |
| Meperidine | 114 | 0.14 |
| N-(7'-fluoro-n-heptyl-1')-4-phenyl-4-propionyloxy-piperidine hydrochloride | 0.035 | 450 |
| N-(6'-nitro-n-hexyl-1')-3-methyl-4-phenyl-4-acetoxy-piperidine hydrochloride | 0.048 | 350 |
| N-(6'-chloro-n-hexyl-1')-4-phenyl-4-propionyloxy-piperidine hydrochloride | 0.14 | 115 |
| N-(7'-nitro-n-heptyl-1')-4-phenyl-4-acetoxy-piperidine hydrochloride | 0.18 | 90 |
| N-[3'-(3''-chloropropyl-1''-mercaptyl)-n-propyl-1']-4-phenyl-4-acetoxy-piperidine hydrochloride | 0.27 | 60 |
| N-(7'-fluoro-n-heptyl-1')-3-methyl-4-phenyl-4-acetoxy-piperidine hydrochloride | 0.3 | 50 |
| N-(7'-fluoro-n-heptyl-1')-3-methyl-4-phenyl-4-propionyloxy-piperidine hydrochloride | 0.3 | 50 |
| N-(8'-fluoro-n-octyl-1')-4-phenyl-4-acetoxy-piperidine hydrochloride | 0.3 | 50 |
| N-(7'-fluoro-n-heptyl-1')-4-phenyl-4-acetoxy-piperidine hydrochloride | 0.3 | 50 |

The values tabulated above clearly show that the relative central analgesic activity of the compounds according to the present invention is from 50 to 450 times greater than that of morphine.

The single analgesic dose of the compounds according to the present invention is between 0.5 and 10 mgm., preferably between 1 and 5 mgm. For pharmaceutical purposes the compounds of the invention are administered in the form of dosage unit compositions, such as tablets, coated pills, suppositories, hypodermic solutions and the like, consisting of the selected dose of the particular analgesic compound of the invention uniformly dispersed in a conventional physiologically compatible inert carrier.

The following examples illustrate typical dosage unit compositions comprising a compound of the present invention as the active analgesic ingredient. The parts are parts by weight, unless otherwise specified.

*Example X*

*Suppositories.*—The suppositories are compounded from the following ingredients:

| | Parts |
|---|---|
| N-7'-fluoro-n-heptyl-1')-4-phenyl-4 - propionyloxy-piperidine hydrochloride | 5 |
| Lactose | 45 |
| Cocoa butter | 1600 |
| Total | 1650 |

Compounding procedure:

The piperidine compound is thoroughly admixed with the lactose, and the mixture is uniformly dispersed in the molten cocoa butter. The resulting composition is then poured into cooled suppository molds each holding 1650 mgm. of the composition. Each suppository contains 5 mgm. of the active ingredient.

*Example XI*

*Hypodermic solution.*—The solution is compounded from the following ingredients:

| | Parts |
|---|---|
| N-(7'-fluoro-n-heptyl-1')-4-phenyl - 4 - propionyloxy-piperidine hydrochloride | 1 |
| Sodium chloride | 9 |
| Double-distilled water | q.s. ad by vol. 1 |

Compounding procedure:

The piperidine compound and the sodium chloride are dissolved in a sufficient amount of double-distilled water, and the volume of the solution is then brought to the required amount with additional distilled water. The resulting solution is sterilized and is filled into 1 cc. sterile ampules. Each ampule contains 1 mgm. of the active ingredient.

*Example XII*

*Tablets.*—The tablets are compounded from the following ingredients:

| | Parts |
|---|---|
| N-(7'-fluoro-n-heptyl-1')-4-phenyl-4-propionyloxy-piperidine hydrochloride | 3 |
| Lactose | 80 |
| Corn starch | 63 |
| Finely divided $SiO_2$ | 6 |
| Stearic acid | 0.8 |
| Talcum | 7.2 |
| Total | 160.0 |

Compounding procedure:

The piperidine compound is admixed with 75 parts of lactose, 45 parts of corn starch, 5 parts of $SiO_2$ and 5 parts of a mixture of stearic acid and talcum containing 10% by weight of stearic acid. The resulting mixture is pressed into briquettes, which are forced through a granulating screen. The granulate is then admixed with the remaining amounts of the ingredients, and the mixture is pressed into tables weighing 160 mgm. each. Every tablet contains 3 mgm. of the active ingredient.

Quite obviously, any of the other piperidine compounds embraced by Formula I or their non-toxic acid addition salts may be substituted in the above dosage unit compositions for the particular illustrative compound used.

In addition to powerful central analgesic properties, the compounds of the present invention possess antitussive properties. This activity was tested and demonstrated on a statistically significant number of unanesthetized guinea pigs. The animals were first exposd to an aerosol of citric acid, and the time interval between initial exposure to the aerosol and the occurrence of the first cough reflex was measured as a control value. Thereafter, the animals were withdrawn from the aerosol and were administered varying doses of the piperidine compounds of the invention, whereupon they were again exposed to the aerosol and the time interval was measured. In this manner the dose of each compound which increased the time interval by 100% over the control value was determined ($ED_{100}$). For instance, the $ED_{100}$ of N-(7'-fluoro-n-heptyl-1')-4-phenyl-4-propionyloxy-piperidine hydrochloride was in this manner determined to be 0.04 mgm./kg. Thus, the antitussive activity of this particular compound is 27.5 times greater than that of morphine.

While we have illustrated our invention with the aid of certain specific embodiments thereof, it will be readily apparent to others skilled in the art that our invention is not limited to these specific embodiments and that various changes and modifications can be made without departing from the spirit of the invention or the scope of the appended claims.

We claim:

1. A compound selected from the group consisting of N-substituted 4-phenyl-4-alkanoyloxy-piperidines of the formula

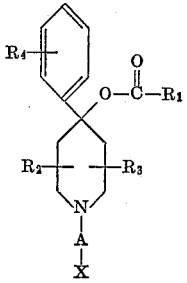

wherein $R_1$ is lower alkyl, $R_2$ and $R_3$ are selected from the group consisting of hydrogen and lower alkyl, $R_4$ is selected from the group consisting of hydrogen, lower alkyl and lower alkoxy, A is selected from the group consisting of alkylene of 5 to 8 carbon atoms, $CH_2$—$CH_2$—$CH$=$CH$—$CH_2$ —$(CH_2)_m$—Y—$(CH_2)_n$— and —$(CH_2)_m$—Y—$(CH_2)_n$—Y—$(CH_2)_o$— where *m*, *n* and *o* are integers from 2 to 4, inclusive, the sum of *m*, *n* and *o* is an integer from 5 to 8, inclusive, and Y is selected from the group consisting of oxygen and sulfur, and X is selected from the group consisting of halogen, nitro and thiocyano, and their non-toxic, pharmacologically acceptable acid addition salts.

2. N - (7' - fluoro - n - heptyl - 1') - 4 - phenyl - 4-propionyloxy-piperidine hydrochloride.

3. N - (6' - nitro - n - hexyl - 1') - 3 - methyl - 4-phenyl-4-acetoxy-piperidine hydrochloride.

4. N - (6' - chloro - n - hexyl - 1') - 4 - phenyl - 4-propionyloxy-piperidine hydrochloride.

5. N - (7' - nitro - n - heptyl - 1') - 4 - phenyl - 4-acetoxy-piperidine hydrochloride.

6. N - [3' - (3" - chloropropyl - 1" - mercaptyl) - n-propyl-1']-4-phenyl-4-acetoxy-piperidine hydrochloride.

7. N - (7' - fluoro - n - heptyl - 1') - 3 - methyl - 4-phenyl-4-acetoxy-piperidine hydrochloride.

8. N - (7' - fluoro - n - heptyl - 1') - 3 - methyl - 4-phenyl-4-propionyloxy-piperidine hydrochloride.

9. N - (8' - fluoro - n - octyl - 1') - 4 - phenyl - 4-acetoxy-piperidine hydrochloride.

10. N - (7' - fluoro - n - heptyl - 1') - 4 - phenyl - 4-acetoxy-piperidine hydrochloride.

References Cited in the file of this patent

UNITED STATES PATENTS

| 2,498,430 | Lee | Feb. 21, 1950 |
| 2,924,603 | Gordon et al. | Feb. 9, 1960 |
| 2,962,501 | Cutler et al. | Nov. 29, 1960 |
| 2,973,363 | Janssen | Feb. 28, 1961 |
| 3,004,889 | Kuna et al. | Oct. 17, 1961 |
| 3,024,166 | Kuna et al. | Mar. 6, 1962 |
| 3,048,594 | Hoffmann et al. | Aug. 7, 1962 |

UNITED STATES PATENT OFFICE
CERTIFICATE OF CORRECTION

Patent No. 3,158,616                        November 24, 1964

Franz Adickes et al.

It is hereby certified that error appears in the above numbered patent requiring correction and that the said Letters Patent should read as corrected below.

Column 1, lines 65 and 66, the formula should appear as shown below instead of as in the patent:

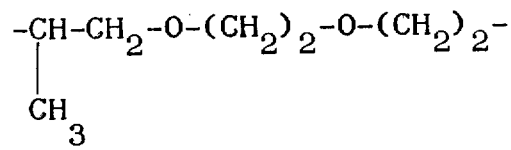

column 3, line 21, for "Hal-A-A" read -- Hal-A-X --; column 4, lines 32 to 45, formula (X) should appear as shown below instead of as in the patent:

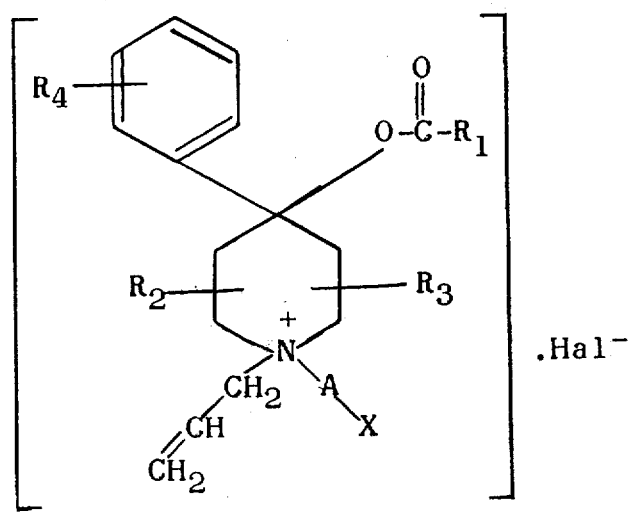

column 9, line 16, for "prescribed" read -- described --; column 20, line 51, for "N-7'-" read -- N-(7'- --; column 22, line 23, for "$CH_2$-$CH_2$-CH=CH-$CH_2$" read -- -$CH_2$-$CH_2$-CH=CH-$CH_2$-, --.

Signed and sealed this 20th day of April 1965.

(SEAL)
Attest:

ERNEST W. SWIDER                      EDWARD J. BRENNER
Attesting Officer                  Commissioner of Patents